(No Model.) 2 Sheets—Sheet 1.

W. H. BATE.
FLOAT FOR BALL COCKS.

No. 513,474. Patented Jan. 30, 1894.

Witnesses
Josephine D. McKenzie.
Henry C. Brown.

Inventor.
Wallace H. Bate.
by Howe & Kellogg.
attys.

THE NATIONAL LITHOGRAPHING COMPANY,
WASHINGTON, D. C.

(No Model.) 2 Sheets—Sheet 2.

W. H. BATE.
FLOAT FOR BALL COCKS.

No. 513,474. Patented Jan. 30, 1894.

Witnesses.
E. H. Granger
G. H. Frey.

Inventor.
Wallace H. Bate,
by his Attorneys
Howe & Kellogg.

UNITED STATES PATENT OFFICE.

WALLACE H. BATE, OF BELMONT, MASSACHUSETTS.

FLOAT FOR BALL-COCKS.

SPECIFICATION forming part of Letters Patent No. 513,474, dated January 30, 1894.

Application filed January 31, 1893. Serial No. 460,268. (No model.) Patented in England February 10, 1893, No. 2,945.

*To all whom it may concern:*

Be it known that I, WALLACE H. BATE, a citizen of the United States, residing in Belmont, in the county of Middlesex and State of Massachusetts, have invented certain new and useful Improvements in Floats for Ball-Cocks, (for which I have obtained Letters Patent of Great Britain, dated February 10, 1893, No. 2,945,) of which the following, taken in connection with the accompanying drawings, is a specification.

My invention relates to floats for closing cocks in the supply pipes for tanks and similar vessels, and has for its object the production of a float that will close the cock more firmly than any now in use, thus preventing leakage, and also one that will prevent the noise caused by the filling of the tank. I accomplish these objects by the device shown in the accompanying drawings, in which—

Figures 1, 2, 3, 4, 5:
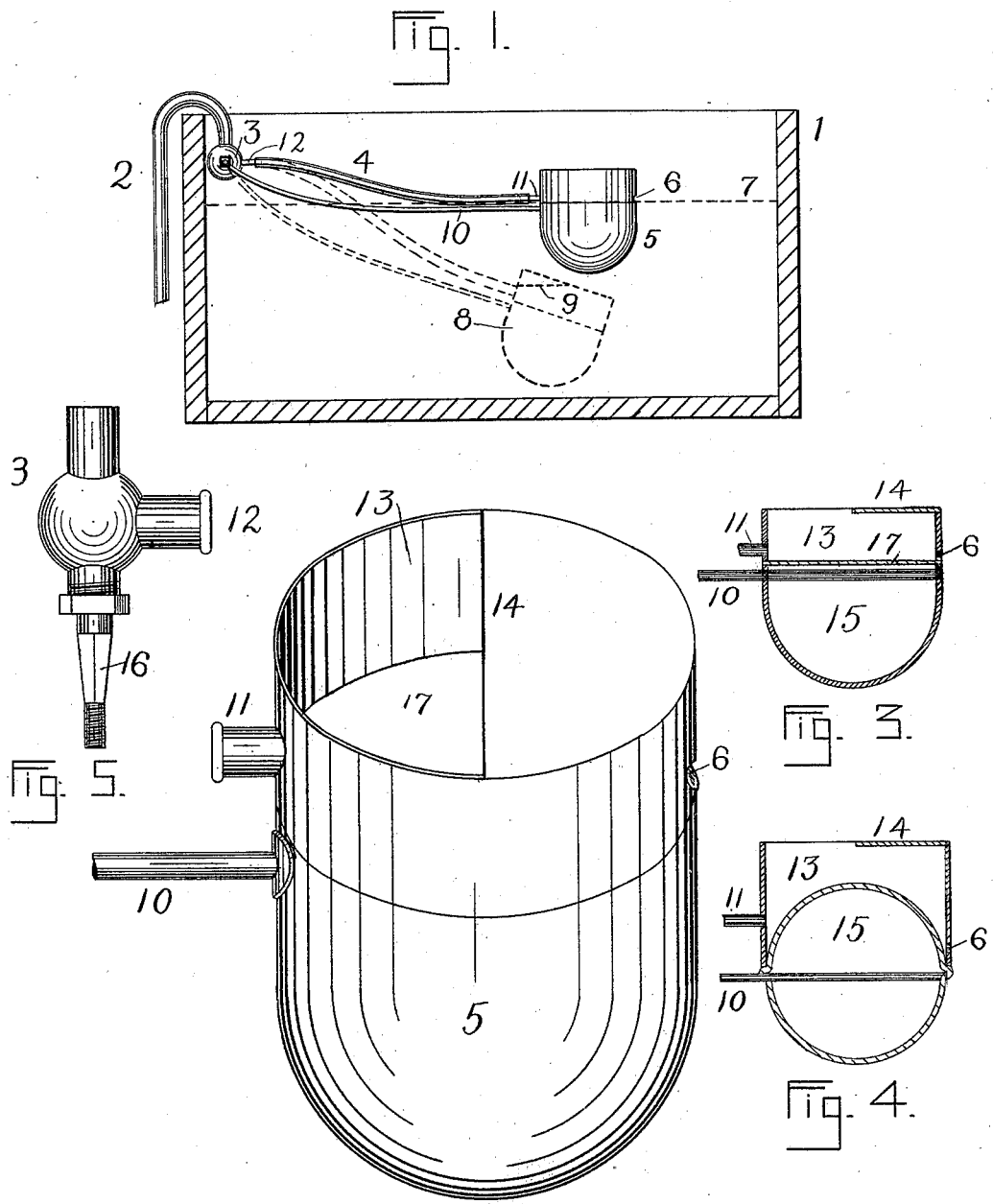
Figure 6:
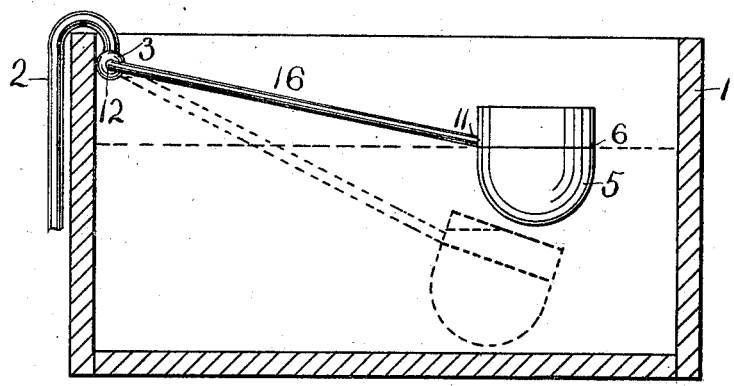
Figure 7:
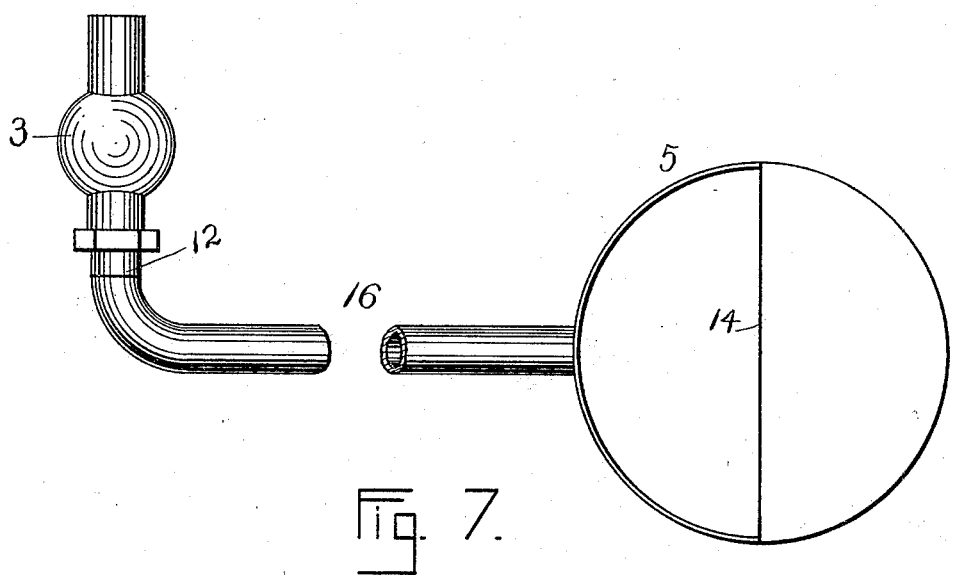

Figure 1, is a sectional view of a tank containing a float constructed in accordance with the principles of my invention. Fig. 2 is an isometrical view of the float. Fig. 3 is a vertical section through the float. Fig. 4 is a vertical section through a float constructed in a modified form upon the principles of my invention. Fig. 5 is a view of one form of stop-cock that may be used in the supply pipe. Fig. 6 is a sectional view of a tank showing another method of connecting the float to the stop-cock, and Fig. 7 is a plan view of the float and connections as shown in Fig. 6.

Like numerals refer to like parts in all the figures.

Referring to the drawings, 1 is a tank adapted to contain fluid; 2 is the pipe supplying the fluid to said tank.

3 is the stop-cock in the pipe 2.

4 is a flexible pipe, as for example, a piece of rubber hose connecting the outlet 12, of the stop-cock 3, to the inlet 11, of the float 5.

6 is a small outlet in the upper part of the float.

10 is a rod connecting the float with the stop-cock, and by which the valve is turned.

13 is a chamber superimposed upon an air tight chamber 15, said chamber 13 having an inlet nipple 11, an outlet 6, and a lip 14, partially closing the top of the chamber.

The operation of my invention is as follows:—The fluid having been drawn from the tank, the float 5, falls to the bottom of the tank, as shown by the dotted lines 8, Fig. 1, and in so doing, turns the valve rod 16, of the stop-cock 3, thus admitting the fluid, which passes through the flexible pipe 4, to the chamber 13, and fills the same till it reaches the edge of the lip 14, as shown at 9, Fig. 1, when it overflows into the tank. The float is thus weighted by the fluid in the chamber 13, and remains at the bottom of the tank, allowing the full supply of fluid to be admitted until there is a sufficient depth of fluid in the tank to raise the float together with the fluid in the chamber. As the float rises, the supply of fluid is shut off, leaving the chamber 13 filled, but this chamber, being above the level of the fluid in the tank, will discharge its contents through the small opening 6, in the side near the bottom, thus increasing the bouyancy of the float, by removing the weight of the fluid therefrom, and adding the fluid to that already in the tank. This causes the float to rise still farther, thus closing the valve more tightly than could otherwise be done. The fluid running over the sides of the float and having but a short distance to fall, makes but little, if any, noise; and the spattering, common in tanks where the fluid is admitted directly from the stop-cock, is entirely avoided.

I prefer to make the float as shown in Figs. 2 and 3, in which the chamber 13, is formed by a partition 17, a little below the top of the walls of the float, but if desired, I can utilize the ball floats, as commonly made by surrounding one half of the ball with a band, as shown in Fig. 4.

In order to give the float greater strength to support the weight of the fluid, I carry the rod 10, completely through the float, as shown in Figs. 3 and 4, securing both sides of the float thereto.

Instead of using a flexible pipe 4, and a rod 10, I may suspend the float by a metal pipe 16, in connection with a suitable stop-cock, and convey the fluid to the chamber by means of this pipe, as shown in Figs. 6 and 7.

Having thus described my invention and the operation thereof, what I claim, and desire to secure by Letters Patent of the United States, is—

1. In a tank or similar vessel, a float consisting of an air tight chamber and a chamber adapted to receive and discharge fluid; and means for connecting said last named chamber with a supply of fluid, substantially as shown, and for the purpose specified.

2. In a tank or similar vessel, a float consisting of an air tight chamber and a chamber adapted to receive and discharge fluid; means for connecting said last named chamber with a supply of fluid; and means for controlling the admission and discharge of said fluid, substantially as shown and for the purpose specified.

3. The float 5, consisting of an air tight chamber 15, and the chamber 13, provided with an inlet 11 and outlet 6, substantially as shown and described.

4. The float 5, consisting of an air tight chamber 15, and the chamber 13, provided with a lip 14; inlet 11 and outlet 6, substantially as shown and described.

5. The combination of the tank 1; supply pipe 2; stop-cock 3 in said supply pipe; float 5, consisting of an air tight chamber 15, and a chamber 13 adapted to receive and discharge fluid; the rod 10, connecting said float to the valve of said stop-cock; and the pipe 4, connecting the inlet of said float to the outlet of said stop-cock, substantially as shown and described.

In testimony whereof I have hereunto subscribed my name this 23d day of January, A. D. 1893.

WALLACE H. BATE.

Witnesses:
CHAS. A. KELLOGG,
JOSEPHINE D. MCKENZIE.